United States Patent Office 3,010,205
Patented Nov. 28, 1961

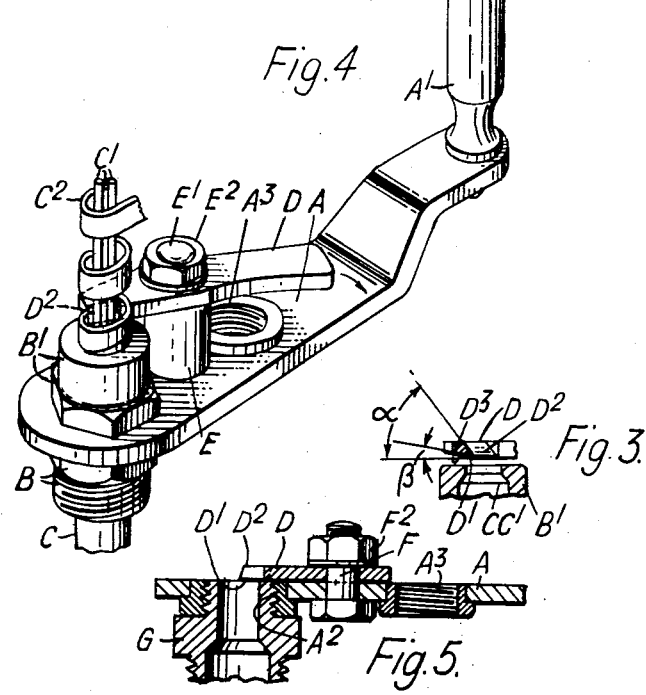

3,010,205
STRIPPING TOOLS FOR ELECTRIC CABLES
Bertram Altson Pearl, Caulfield, Victoria, Australia, assignor to Pyrotenax Limited, Hebburn-on-Tyne, England, a British company
Filed Aug. 14, 1959, Ser. No. 833,716
Claims priority, application Australia Aug. 25, 1958
12 Claims. (Cl. 30—95)

This invention relates to a sheath stripping tool for an electric cable, more especially although not essentially for stripping a length of metal sheath from the end of a metal sheathed cable, for example of the mineral-insulated kind.

The invention has for its object to provide an improved and inexpensive stripping tool which enables a length of sheath to be stripped from a sheathed electric cable quickly and efficiently.

The stripping tool according to the invention comprises an operating arm which can be rotated about the cable to be stripped while such cable is being held against rotation and a cutter blade carried by such operating arm having a cutting edge which, in the cutting position, projects outwardly from inside the cable sheath at an acute angle to the radius of the cable at the point of emergence through the external surface of the sheath, the cutter blade being so shaped as to sever a helical strip from the cable sheath when the operating arm is rotated.

Preferably, the cutting edge of the cutter blade lies in a transverse datum plane which, during operation, is at right angles or nearly at right angles to the axis of the cable to be stripped.

In one construction of stripping tool, the cutting edge is formed at the junction of two inclined faces on the cutter blade each lying wholly on the front side of the transverse datum plane, namely the side which during operation is remote from the body of the cable to be stripped, the front inclined face constituting an abutment face and being inclined to the datum plane at a relatively large angle whilst the rear inclined face constitutes a relief face and is inclined to the datum plane at a relatively small angle. In such construction, the abutment face is preferably inclined to the datum plane at an angle whose projection in the plane at right angles to the length of the cutting edge lies between 45 degrees and 75 degrees, whilst the relief face is preferably inclined to the datum plane at an angle whose projection in the plane at right angles to the length of the cutting edge lies between 7 degrees and 12 degrees.

Conveniently, the cutter blade may be adjustably mounted on the operating arm so that the angular position of its cutting edge relative to the radius through the point of emergence can be varied to suit sheathed cables of various kinds and sizes.

The operating arm is preferably provided at or near one end with a handle for effecting rotation of such arm and near its other end with an aperture for receiving a cable gland itself for receiving the cable to be stripped, the grip of the gland on the cable being sufficiently loose to permit relative movement between them while stripping is effected by rotation of the operating arm. In a preferred arrangement, the operating arm is provided near its end remote from the handle with a plurality of apertures respectively for receiving cable glands of different sizes, means being provided for clamping the cutter blade in the position appropriate to the aperture in use. With an adjustably mounted cutter blade, the apertures may conveniently be so positioned as to cooperate with a single pivotal mounting for such cutter blade.

The invention may be carried into practice in various ways but a preferred construction of stripping tool according thereto will now be described by way of example with reference to the accompanying drawings, in which FIGURE 1 is a plan view of the main part of the preferred tool, FIGURE 2 shows the main part of the tool and cable to be stripped in vertical section on the line 2—2 of FIGURE 1, FIGURE 3 shows the tool and cable to be stripped in vertical section on the line 3—3 of FIGURE 1, FIGURE 4 is a perspective view of the preferred tool in use, and FIGURE 5 shows in vertical section a modification of the preferred stripping tool.

The preferred tool comprises a generally flat operating arm A having at one end a handle $A^1$ and near the other end a pair of apertures $A^2$ and $A^3$. For convenience the arm A is shown lying in a generally horizontal plane with its handle $A^1$ extending upwards. The two apertures $A^2$ and $A^3$ are of different diameters respectively to receive cable glands of two different external sizes, the cable glands of each external size being made in the wellknown manner with a range of internal sizes suited to electric cables of differing diameters. Cable glands of the usual kind may be employed, but before such a cable gland is screwed into one of the apertures $A^2$ or $A^3$, its compression ring is removed. The drawings show a cable gland B screwed up into the aperture $A^2$ in the arm A with finger grip tightness, its locking nut $B^1$ being screwed down over such gland to abut against the upper face of the arm A, an electric cable, conveniently of the kind having a metal sheath C surrounding mineral insulation around three conductors $C^1$, having been subsequently pushed up through such gland B. The arm A can then be rotated in a horizontal plane about the vertical axis of the cable $CC^1$, the gland B being a slightly loose fit (although still a close fit) around the cable $CC^1$ to permit such gland B to rotate with the arm A.

Adjacent to the apertures $A^2$ and $A^3$ the operating arm A carries an upstanding shouldered boss E on its upper face. Pivotally mounted on the narrower free end $E^1$ of such boss E is a generally flat cutter blade D lying in a transverse plane at right angles to the axis of the cable $CC^1$. Beyond such cutter blade D the free end $E^1$ of the boss E is screwthreaded to receive a lock nut $E^2$ by means of which the cutter blade D can be clamped in any chosen orientation. The pivot axis of the cutter blade D is approximately equally spaced from each of the apertures $A^2$ and $A^3$ so that the cutter blade D can be turned to cooperate with a cable received through either of such apertures, and the height of the shouldered boss E is such that the blade D will engage the cable just beyond the upper end of the cable gland B. In use, the pivotal mounting for the cutter blade D is also used to adjust the blade D so that its cutting edge meets the sheath C at a chosen angle, as will be later described.

The cutting edge $D^1$ of the blade D is formed at the junction of two inclined faces on the blade at its cutting end, each such face lying wholly above the transverse plane through such cutting edge at right angles to the axis of the cable $CC^1$, such plane being herein referred to as the transverse datum plane. The uppermost of such faces $D^2$, i.e. the face remote from the body of the cable $CC^1$, extends for only a portion of the width of the blade and is steeply inclined to the transverse datum plane. The face $D^3$ nearer to the body of the cable $CC^1$ extends for the whole width of the blade D and is inclined to such transverse datum plane at only a relatively small angle. During stripping of the cable sheath the steeply inclined face acts as an abutment against which presses the portion of stripped sheath $C^2$ (see FIGURE 4) adjacent to the cutting edge $D^1$ so as to move the tool axially relatively to the cable $CC^1$ as the operating arm A is rotated. The face $D^3$ being relieved, very little reactive force is applied in the opposite sense (upwardly), but the angle between such face $D^3$ and the transverse datum plane is important in determining the pitch of helical strip severed from the sheath. Increasing the angle of such relieved face $D^3$ increases the pitch of the severed helical strip of sheath $C^2$.

The cutting edge $D^1$ of the blade in use intersects the sheath C at an acute angle to the tangent plane to the sheath C at the point of intersection, such angle not itself being critical but the cutter blade D being adjusted by means of its pivotal mounting so that the free end of the cutting edge $D^1$ lies within the sheath approximately midway between the nearest conductor $C^1$ and such sheath C. It will thus be clear that a considerable portion of the cutting edge $D^1$ lies within the sheath $C^1$ since such edge lies along a chord of the cable and not along a radius thereof. The length of the cutter blade D however, in relation to the distance between the pivotal mounting E and either one of the apertures $A^2$ or $A^3$, is so chosen that the free end of the cutting edge $D^1$ would not, if the blade D were rotated, swing beyond the axis of a cable received through either of such apertures. With the cutting edge $D^1$ inclined to the tangent plane to the sheath C in the above-described manner, the force applied by the tool to the sheath, other than force in or parallel to the tangent plane, is directed inwardly and not outwardly so that the shearing force resulting from the stripping action is directed inwardly. The interior of the cable $CC^1$ acts as a buttress against such inward shearing force so that a cleaner and more efficient cutting action is obtained due to the sheath C being in compression rather than in tension.

The projections in the plane at right angles to the length of the cutting edge $D^1$ of the angles between the abutment face $D^2$ and the transverse datum plane and between the relief face $D^3$ and such datum plane, respectively termed the abutment angle and the relief angle, each lie between preferred limits in order to give respectively the most efficient and clean cutting action and the preferred pitch of the helical cutting path. FIGURE 3 shows the projections of these angles, respectively $\alpha$ degress and $\beta$ degress, in the tangent plane, but it will be appreciated that the angles $\alpha$ and $\beta$ will not necessarily lie between the preferred limits since the tangent plane is inclined to the plane at right angles to the length of the cutting edge $D^1$. The abutment angle preferably lies between 45 degrees and 75 degrees and conveniently a suitable angle is 65 degrees, whilst the relief angle preferably lies between 7 degrees and 12 degrees and conveniently a suitable angle is 9 degrees. The projection in the plane at right angles to the length of the cutting edge $D^1$ of the angle between the abutment face $D^2$ and the relief face $D^3$ is thus conveniently 56 degrees, and preferably lies between 33 degrees and 68 degrees.

When it is desired to strip a portion of sheath from the end of a cable, such cable $CC^1$ is pushed up through the cable gland B fitted in the appropriate aperture $A^2$ in the operating arm A so that the end of such cable abuts against the cutter blade D and such blade is adjusted to lie in the correct cutting position relative to the cable, as above described. The operating arm A is then rotated, the cable being held against rotation, for example by means of a pair of pliers, and pressure is applied to such arm A in the direction of the axis of the cable $CC^1$ so that the cutting edge $D^1$ of the blade D is caused to penetrate the sheath C. Once the blade D has formed its initial cut in the sheath C, it is unnecessary to continue the application of such axial pressure to the arm A.

As shown in FIGURE 4, the helical strip $C^2$ severed from the cable body is forced away from the tool in the direction of the axis of the cable $CC^1$ so that it does not hinder further operation of the tool. The severed helical strip $C^2$ surrounds the conductors $C^1$ of the cable and thus acts to protect them from damage as stripping proceeds. The tool cuts the sheath C cleanly and efficiently and stripping may conveniently be terminated by placing an abutment around the cable $CC^1$ at the appropriate position thereon (for example as the pair of pliers used to hold such cable against rotation) and continuing rotation of the operating arm A after it has met such abutment so as to completely detach the helical strip of sheath $C^2$ from the cable $CC^1$. The resulting free end of sheath C from which the conductors $C^2$ protrude is free from burring or other irregularities and is square to the axis of the cable $CC^1$, i.e. lies in a plane transverse to the axis of the cable. Generally, it will be convenient to sever helical strips of sheath C about 2 inches long in a single operation, but if desired a longer strip may be cut off preferably by unwinding the initial portion of the strip and threading it through the spare aperture $A^3$ in the operating arm A since otherwise such a longer strip of severed sheath may twist and become entangled with or damage the cable conductors $C^2$.

It will be appreciated that if the cable to be stripped is suited to a gland fitting the aperture $A^3$ instead of the aperture $A^2$ in the arm A, such gland may be fitted into such aperture $A^3$ leaving the aperture $A^2$ spare. The cutter blade D will in this case be adjusted to cooperate with such aperture $A^3$ instead of the aperture $A^2$.

It will be clear that in the above-described arrangement, the operating arm has been described as horizontal and rotatable about a vertical cable for convenience only and that in practice the operation of the stripping tool will rotate the operating arm with one hand and hold the cable with a pair of pliers in the other hand so that the actual orientation of such arm and cable may vary considerably with individual operators.

In a modification of the preferred construction of tool, the cutter blade D, instead of being mounted in spaced relationship to the operating arm A, is pivotally mounted on a short projection F to lie closely against such operating arm A. A thin washer may be interposed between the arm A and the cutter blade if desired, and as before, a lock nut $F^2$ is provided for clamping the cutter blade in any desired angular position. In other respects, the tool is arranged in the manner previously described and the same reference letters are otherwise retained in FIGURE 5. In operation, however, when a cable is to be stripped, the body part G only of a short cable gland for receiving such cable is fitted into the aperture $A^2$ in use, such gland body G not projecting beyond the face of the operating arm A adjacent to which the cutter blade D is mounted. Having pushed the cable up through the gland body G so that its free end contacts the cutter blade D, the tool is operated in the manner previously described. The modified construction facilitates the stripping of the sheath from a cable end portion which is not straight.

The above described arrangement may also be modified in various other ways within the scope of the invention. For example, the operating arm may be provided with four apertures instead of two, the cutter blade being again pivotally mounted or otherwise adjustably mounted to cooperate with any one of such apertures. Alternatively, the operating arm may be provided with a plurality of cutter blades instead of a single blade adjustably mounted. Again, instead of providing a lock nut or other clamping means for clamping the cutter blade in a chosen position, the cutter blade may be associated with micro-adjustment means for varying its angular position. For example, such micro-adjustment may be effected in the wellknown manner by means of eccentric headed screws. Although in the drawings the cutting edge of the blade is shown lying in a transverse datum plane strictly at right angles to the axis of the cable, this is not essential, and it is sometimes more convenient in practice for the cutting edge to be slightly inclined to the direction of the length of the cutter blade, thereby slightly increasing the angle between such cutting edge and the radius at the point of emergence, in which case the transverse datum plane will not lie strictly at right angles to the axis of the cable. Furthermore, means other than that described may be provided whereby the operating arm can be rotated about the cable. It will also be appreciated that the cutter blade or blades may be constructed in various ways other than that described, and that the stripping tool may be used to strip the sheath from various forms of cable other than metal sheathed mineral insulated cables.

What I claim as my invention and desire to secure by Letters Patent is:

1. A stripping tool for stripping a length of sheath from a sheathed electric cable held against rotation, comprising an operating arm having an elongated main body, a handle carried adjacent to one end of such main body, said body having an aperture therein adjacent to the end thereof remote from the handle, an annular member having an internal diameter slightly greater than the external diameter of the cable sheath to be stripped, means for detachably securing the annular member in the aperture in the main body of the operating arm, the length of the annular member being sufficient to ensure that the portion of cable to be stripped, when inserted through the annular member, is accurately centralized with respect to the aperture, a cutter blade having two inclined faces at the junction of which is formed a cutting edge, and means for mounting the cutter blade, on the operating arm in a position with respect to the aperture such that the cutting edge lies at least approximately in a plane transverse to the axis of the annular member and close to the end face of such member through which projects the portion of cable to be stripped, and, in its cutting position, projects outwardly from the cable sheath at an acute angle to the radius of the cable at the point of emergence through the external surface of the sheath, the two inclined faces of the cutter blade lying at such angles to the transverse plane as to maintain the cutting edge in a helical cutting path through the sheath when the operating arm is rotated, whereby a helical strip of sheath is severed from the cable.

2. A stripping tool as claimed in claim 1 in which the two inclined faces on the cutter blade each lies wholly on the front side of the transverse plane, namely the side which during operation is remote from the body of the cable to be stripped, the front inclined face constituting an abutment face and being inclined to the transverse plane at a relatively large angle and the rear inclined face constituting a relief face and being inclined to the transverse plane at a relatively small angle.

3. A stripping tool as claimed in claim 1 in which the means for mounting the cutter blade includes a pivotal support about which the cutter blade can be rotated, and means for locking the cutter blade in a chosen position of adjustment.

4. A stripping tool for stripping a length of sheath from a sheathed electric cable held against rotation, comprising an operating arm having an elongated main body, a handle carried adjacent to one end of such main body, and annular member having an internal diameter slightly greater than the external diameter of the cable sheath to be stripped, means for detachably securing the annular member in the main body of the operating arm adjacent to the end thereof remote from the handle, an abutment on the annular member engaging with the main body and ensuring that the annular member, when secured in a position, projects only beyond the rear face of the main body for a distance sufficient to ensure that the cable to be stripped, when inserted through the annular member, is accurately centralized with respect to the aperture, a cutter blade having two inclined faces at the junction of which is formed a cutting edge, and means for mounting the cutter blade on the main body in a position with respect to the aperture such that the cutting edge lies close to the front face of the main body and in its cutting position, projects outwardly from the cable sheath at an acute angle to the radius of the cable at the point of emergence through the external surface of the sheath, the angular positions of the two inclined surfaces of the cutter blade being such as to maintain the cutting edge in a helical cutting path through the sheath when the operating arm is rotated, whereby a helical strip of sheath is severed from the cable.

5. A stripping tool as claimed in claim 4 in which the two inclined faces of the cutter blade each lies wholly on the front side of a plane transverse to the axis of the annular member close to the front face of the main body of the operating arm, the front inclined face constituting an abutment face and being inclined to the transverse plane at a relatively large angle and the rear inclined face constituting a relief face and being inclined to the transverse plane at a relatively small angle.

6. A stripping tool as claimed in claim 5 in which the means for mounting the cutter blade includes a pivotal support about which the cutter blade can be rotated, and means for locking the cutter blade in a chosen position of adjustment.

7. A stripping tool for stripping a length of sheath from a sheathed electric cable held against rotation, comprising an operating arm having an elongated main body, said main body having an aperture therein adjacent to one end of the main body, a cable centralizing member, means for detachably securing the centralizing member in the aperture, a cutter blade having two inclined faces at the junction of which is formed a cutting edge, and means for mounting the cutter blade on the operating arm in a position with respect to the aperture such that the cutting edge lies at least approximately in a plane transverse to the axis of the aperture and, in its cutting position, projects outwardly from the cable sheath at an acute angle to the radius of the cable at the point of emergence through the sheath, the two inclined faces of the cutter blade each lying wholly on the front side of such transverse plane which during operation is remote from the main body of the cable to be stripped, the front inclined face constituting an abutment face and being inclined to the transverse plane at an angle lying between 45 degrees and 75 degrees and the rear inclined face constituting a relief face and being inclined to the transverse plane at an angle lying between 7 degrees and 12 degrees, whereby, when the operating arm is rotated, a helical strip of sheath is severed from the cable.

8. A stripping tool as claimed in claim 7 in which the means for centralizing the cable with respect to the aperture comprises an annular member and means for detachably securing such annular member in the aperture, the internal diameter of the annular member being slightly greater than the diameter of the cable to be stripped to permit relative movement between such member and such cable during operation and the length of such annular member being sufficient to act as a guide locating the axis of the portion of cable to be stripped accurately in line with the axis of the aperture.

9. A stripping tool as claimed in claim 8 in which the means for mounting the cutter blade includes a pivotal support about which the cutter blade can be rotated, and means for locking the cutter blade in a chosen position of adjustment.

10. A stripping tool for stripping a length of sheath from a sheathed electric cable held against rotation, comprising an operating arm having an elongated main body, a handle carried adjacent to one end of said main body, a cutter blade having two inclined faces at the junction of which is formed a cutting edge, a pivotal mounting for the cutter blade on the main body at a position spaced from the handle, said main body having a plurality of apertures therein spaced equidistantly from the pivotal mounting for the cutter blade, the axis of such pivotal mounting being parallel to the axes of the apertures, whereby rotation of the cutter blade causes the cutting edge thereof to move in a plane transverse to the axes of the apertures, means for centralizing the portion of cable to be stripped with respect to any one of the apertures, and means for locking the cutter blade in a position associated with the aperture through which projects the portion of cable to be stripped, the cutting edge of the cutter blade, in the locked position thereof, projecting outwardly from the cable sheath at an acute angle to the radius of the cable at the point of emergence through the external surface of the sheath, and the two inclined faces of the cutter blade lying at such angles to the transverse plane as to maintain the cutting edge in a helical cutting path through the sheath when the operating arm is rotated, whereby a helical strip of sheath is severed from the cable.

11. A stripping tool as claimed in claim 10 in which the two inclined faces on the cutter blade each lie wholly on the front side of the transverse plane, which during operation is remote from the body of the cable to be stripped, the front inclined face constituting an abutment face and being inclined to the transverse plane at a relatively large angle and the rear inclined face constituting a relief face and being inclined to the transverse plane at a relatively small angle.

12. A stripping tool as claimed in claim 10 in which the means for centralizing the cable with respect to the chosen aperture comprises an annular member and means for detachably securing the annular member in such aperture, the internal diameter of the annular member being slightly greater than the diameter of the cable to be stripped to permit relative movement between such member and such cable during operation and the length of such annular member being sufficient to act as a guide locating the axis of the portion of cable to be stripped accurately in line with the axis of the aperture.

References Cited in the file of this patent

UNITED STATES PATENTS

| | | |
|---|---|---|
| 1,011,157 | Chytraus | Dec. 12, 1911 |
| 2,288,670 | Babiary | July 7, 1942 |
| 2,897,702 | Ghiglia | Aug. 4, 1959 |

FOREIGN PATENTS

| | | |
|---|---|---|
| 568,907 | Great Britain | Apr. 25, 1945 |